US00RE38354E

(19) United States
(12) Reissued Patent
Hsu

(10) Patent Number: US RE38,354 E
(45) Date of Reissued Patent: Dec. 23, 2003

(54) CIRCLE CUTTER

(75) Inventor: Walter W. Hsu, Yin-Lin (TW)

(73) Assignee: Welter Co., Ltd. (TW)

(21) Appl. No.: 10/016,608

(22) Filed: Nov. 1, 2001

Related U.S. Patent Documents

Reissue of:
(64) Patent No.: 5,974,672
Issued: Nov. 2, 1999
Appl. No.: 09/198,410
Filed: Nov. 24, 1998

(51) Int. Cl.[7] ..... B26D 3/00
(52) U.S. Cl. ..... 30/310; 30/300
(58) Field of Search ..... 30/300, 310; 33/27.01, 33/27.04, 27.07, 27.31; 83/490, 541, 544, 596, 555, 745

(56) References Cited

U.S. PATENT DOCUMENTS

| | | | | |
|---|---|---|---|---|
| 3,621,574 A | | 11/1971 | Yanke et al. | 30/290 |
| 4,173,913 A | | 11/1979 | Nicholson | 83/555 |
| 4,426,781 A | | 1/1984 | Kufrin | 30/310 |
| 4,530,156 A | * | 7/1985 | Kettlestrings | 33/27.01 |
| 4,773,798 A | | 9/1988 | Gaster et al. | 408/102 |
| 5,007,320 A | | 4/1991 | Craig et al. | 83/745 |

* cited by examiner

*Primary Examiner*—Douglas D. Watts
(74) *Attorney, Agent, or Firm*—Sofer & Haroun, LLP

(57) ABSTRACT

A circle cutter, particularly a cutting instrument, is adapted for cutting circles on objects. It includes a rotary disc assembly and a cutting tool. The rotary disc assembly is made up of an outer ring board, a rotary disc, a fixing ring cap and a plurality of beads. The rotary disc mounted to the outer ring board is movably limited in place by the fixing ring cap and are rotatably supported by the multiple beads received in a tunnel defined between the outer ring board and the rotary disc. On the rotary disc are disposed a plurality of holes marked with a numeral that is the diameter of a circle to be cut. The cutting tool has a hollow pen stick and a cutting knife attached to a knife clip that is movably engaged with a holding head. The holding head is further secured to the bottom end of the hollow pen stick and is free to rotate with respect to the pen stick so that the cutting knife can be smoothly guided in a cutting operation.

18 Claims, 6 Drawing Sheets

CIRCLE CUTTER

Matter enclosed in heavy brackets [ ] appears in the original patent but forms no part of this reissue specification; matter printed in italics indicates the additions made by reissue.

BACKGROUND OF THE INVENTION

The present invention relates to a circle cutter, particularly to an instrument adapted for cutting circles on objects. It includes a rotary disc assembly and a cutting tool. The rotary disc assembly is made up of an outer ring board, a rotary disc, a fixing ring cap and a plurality of beads. The rotary disc mounted to the outer ring board is movably limited in place by the fixing ring cap and are rotatably supported by the multiple beads received in a tunnel defined between the outer ring board and the rotary disc. On the rotary disc are disposed a plurality of holes marked with a numeral that is the diameter of a circle to be cut. The cutting tool has a hollow pen stick and a cutting knife attached to a knife clip that is movably engaged with a holding head. The holding head is further secured to the bottom end of the hollow pen stick and is free to rotate with respect to the pen stick so that the cutting knife can be smoothly guided in a cutting operation.

The circle cutter of the present invention is placed on top of an object in use, and a cutting tool is selectively engaged with a hole on the rotary disc which is made to rotate by the cutting tool so that a circle area can be cut on the object by a cutting knife mounted to the cutting tool.

In general, to cut circles on various kinds of paper, thin cardboard and soft thin wood board, circles of proper sizes are first drawn on them by a compass and then a pointed knife is used to cut along a drawn line a circle. Such a conventional way of cutting circle is tedious and time consuming in one aspect, and so obtained circles are not smooth and precise enough in another aspect. Besides, accidental cutting can often result in damage to the used material.

SUMMARY OF THE INVENTION

Therefore, the primary object of the present invention is to provide a circle cutting tool or a circle cutter which is operated in a more direct and faster manner to cut circles of various diameters in a smooth and ready manner.

Another object of the present invention is provide a circle cutting tool or a circle cutter equipped with a cutting knife which is operated in such a smooth manner that circles can be cut on material without causing damage to the material.

BRIEF DESCRIPTION OF THE DRAWINGS

FIG. 4A is a partial sectional view of the cutting tool, showing the knife thereof.

DETAILED DESCRIPTION OF THE PREFERRED EMBODIMENTS

Figure 1:
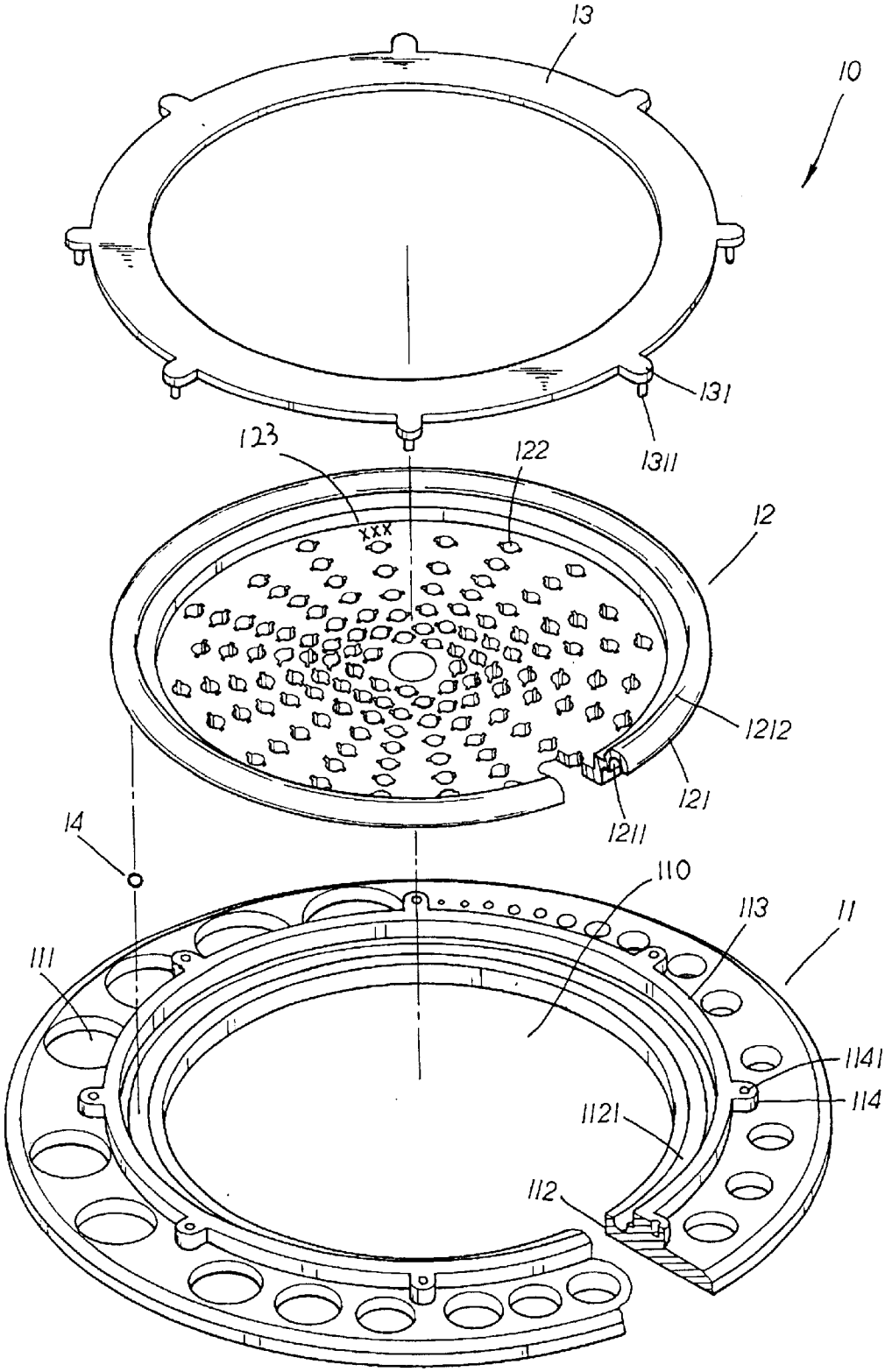
FIG. 1 is a perspective diagram showing the exploded components of the circle cutter of the present invention.
Figure 2:
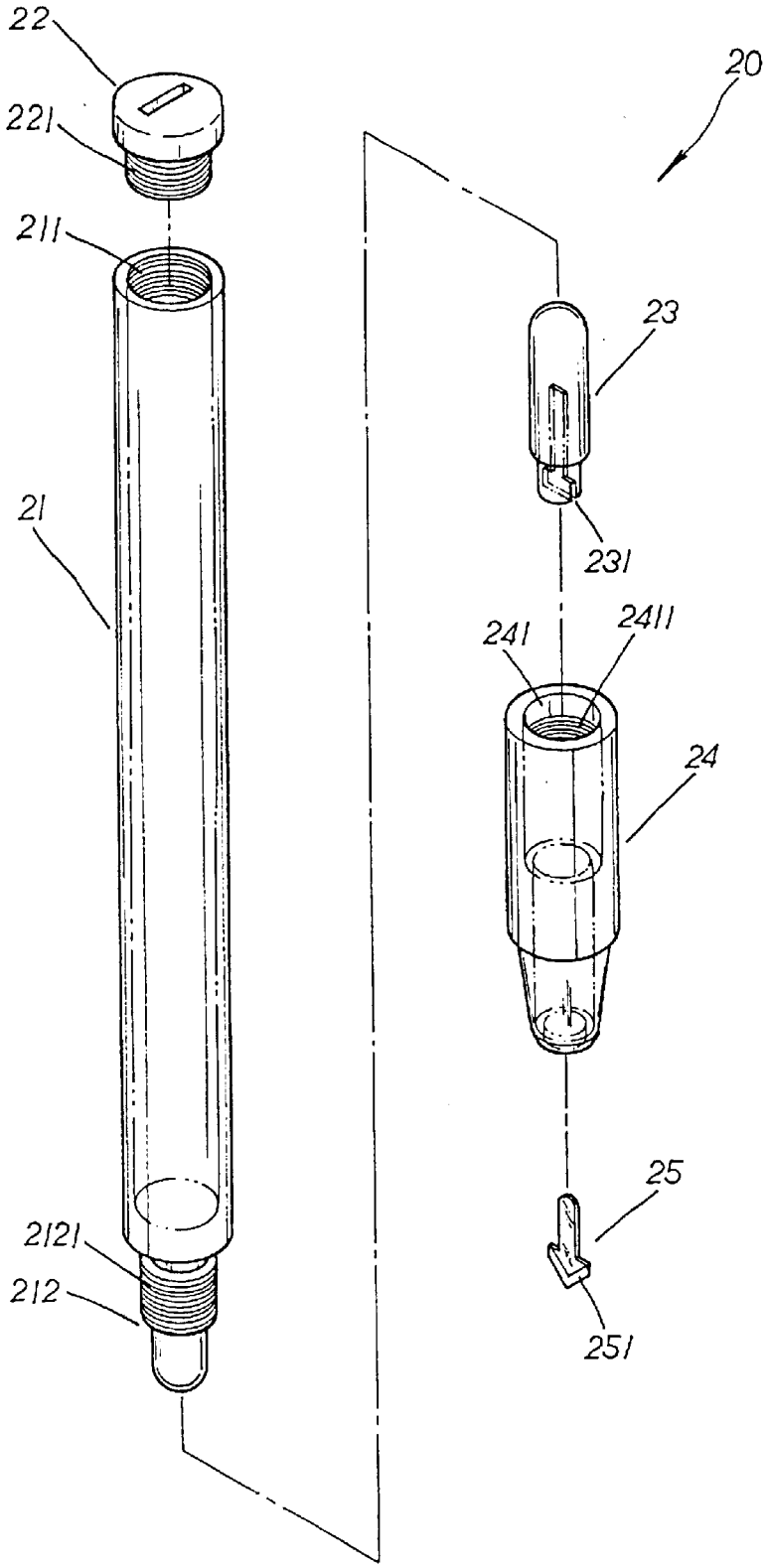
FIG. 2 is a perspective diagram showing the exploded components of a cutting tool of the present invention.

Referring to FIGS. 1, 2 of the present invention, the circle cutter of the present invention comprises a rotary disc assembly 10 and a cutting tool 20. The rotary disc assembly 10 is made up of an outer ring board 11, a rotary disc 12, fixing ring cap 13 and a plurality of beads 14.

On the peripheral area of the outer ring board 11 are disposed a plurality of consecutive circular holes 111 of various diameters gradually reduced one by one for drawing circles. On the inner flange 112 of the outer ring board 11 is disposed a bead retaining groove 1121 having a semi-circular cross section. A raised peripheral rim 113 is located next to the groove 1121 and a plurality of spaced retaining lugs 114 extending radially from the rim 113. Each lug 114 is provided with an insertion hole 1141.

The diameter of the rotary disc 112 is slightly smaller than the inner diameter of the raised peripheral rim 113 of the outer ring board 11. At the periphery of the rotary disc 12 is disposed a downwardly turned engagement flange 121 having a groove 1211 having a semi-circular cross section in conformance to the bead retaining groove 1121 of the outer ring board11. The roof 1212 of the engagement flange 121 has a smooth contour of a semi-circular cross section.

A plurality of insertion holes 122 are spirally located on the rotary disc 12 with their distances to the center of the disc 12 increasingly varied. The diameter 123 of a circle to be drawn can be marked beside each insertion hole 122. On the outer periphery of the fixing ring cap 13 are disposed a plurality of spaced radially extended locking lugs 131 each having an engagement pin 1311.

The cutting tool 20 has a hollow pen stick 21, a top cap 22, a knife clip 23, a holding head 24 and a cutting knife 25. In the hollow interior of the pen stick 21 spare cutting knives 25 are housed. At the top end of the pen stick 21 are disposed internal threads 211 and at the opposite end thereof is disposed a round ended push head 212 provided with external threads 2121 at its enlarged section. The top cap 22 having a T-shaped cross section has external threads 221 at the bottom end thereof. The knife clip 23 is a two-staged cylinder having a dome-shaped top and a reverse T-shaped retaining recess 231 for the holding of the cutting knife 25.

The holding head 24 has a cylindrical top section and a conic lower section having a 3-staged hole 241. The hole 241 is provided with internal threads 2411 at the largest hole section. The cutting knife 25 is made in an arrow shape and has a V-shaped cutting edge 251.

Figure 3:
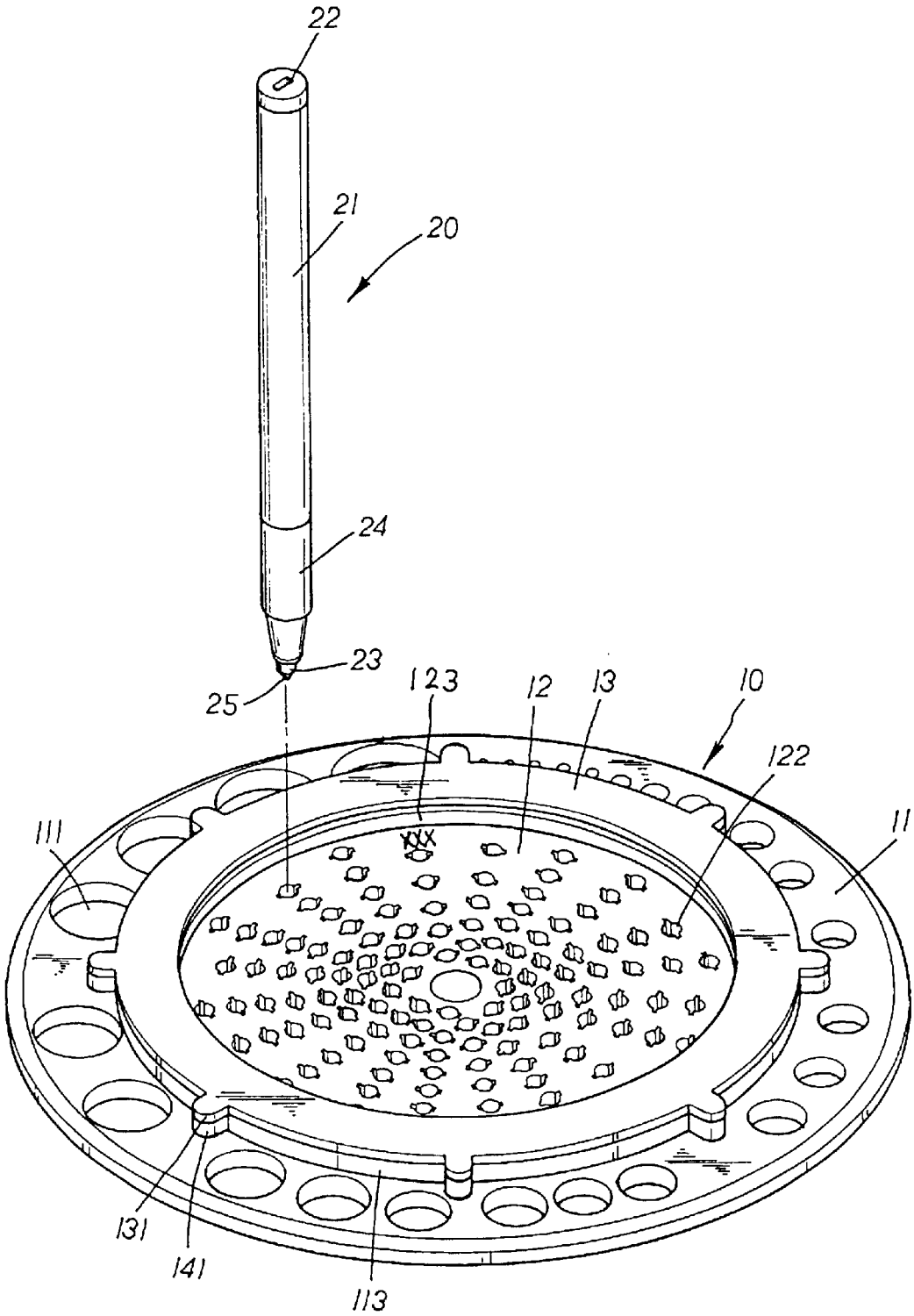
FIG. 3 is a perspective diagram showing the assembly of the circle cutter of the present invention.
Figure 4:
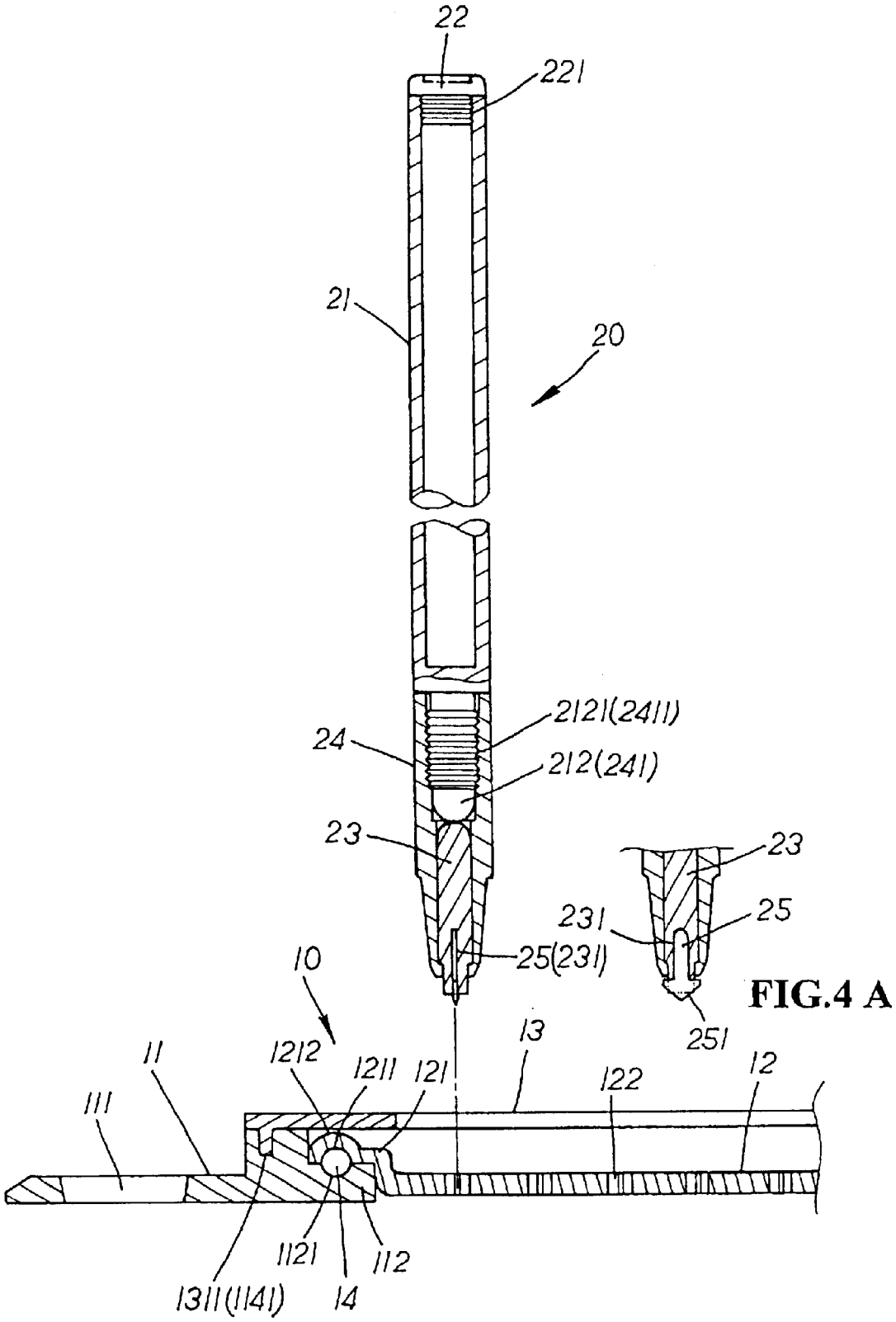
FIG. 4 is a sectional view of the present invention.

Referring to FIGS. 3, 4, in the assembly of the rotary disc assembly 10, the beads 14 are first placed in the bead retaining groove 1121 of the inner flange 112 of the outer ring board 11. And the rotary disc 12 is registered with the central void 110 of the outer ring board 11. At the same time, the engagement flange 121 of the rotary disc 12 is registered with the inner flange 112 of the outer ring board 11. The bottom surface of the rotary disc 12 is positioned a little higher than that the outer ring board 11 when engaged so that the rotary 12 is not in contact with the surface of a table or a working plane, as shown in FIG. 4.

In such a circumstance, the beads 14 are confined in a tunnel defined by the groove 1121 of the inner flange 112 of the outer ring board 11 and the groove 1211 of the engagement flange 121 of the rotary disc 12. Afterwards, the fixing ring cap 13 is engaged with the raised peripheral rim 113 of the outer ring board 11 by registering the engagement pins 1311 of the locking lugs 131 of the ring cap 13 with the insertion holes 1141 of the lugs 14 disposed on the peripheral rim 113 of the outer ring board 11. Then the fixing ring cap 13 is permanently fixed in place by ultrasonic welding so as to rotatably restrain the rounded roof 1212 of the engagement flange 121 of the rotary disc 12, preventing the rotary disc 12 from detachment to complete the assembly.

The cutting tool 20 is assembled by inserting the knife clip 23 into the hole 241 of the holding head 24 from the top thereof with the large cylinder section of the knife clip 23 housed in the middle section of the 3-staged hole 241 of the holding head 24. The small section of the knife clip 23 is in registration with the smallest section of the 3-staged hole 241 of the holding head 24 with part of the small section of the knife clip 23 protruded outside.

Then the holding head 24 is engaged with the hollow bottom end of the pen stick 21 by way of the inner threads 2411 of the 3-staged hole 241 of the holding head 24 and the external threads 2121 of the push end 212. So, with the round ended push head 212 can be in abutment against the dome-shaped top end of the knife clip 23, the knife clip 23 can be freely rotated in the holding head 24. The cutting knife 25 is forced into engagement with the reverse T-shaped retaining recess 231 with the V-shaped cutting edge 251 of the cutting knife 25 exposedly projected out of the bottom end of the retaining recess 231. Afterwards, the top cap 22 is secured to the top end of the hollow pen stick 21 by way of the external threads 221 of the cap 22 and the internal threads 211 of the pen stick 21.

Figure 5:
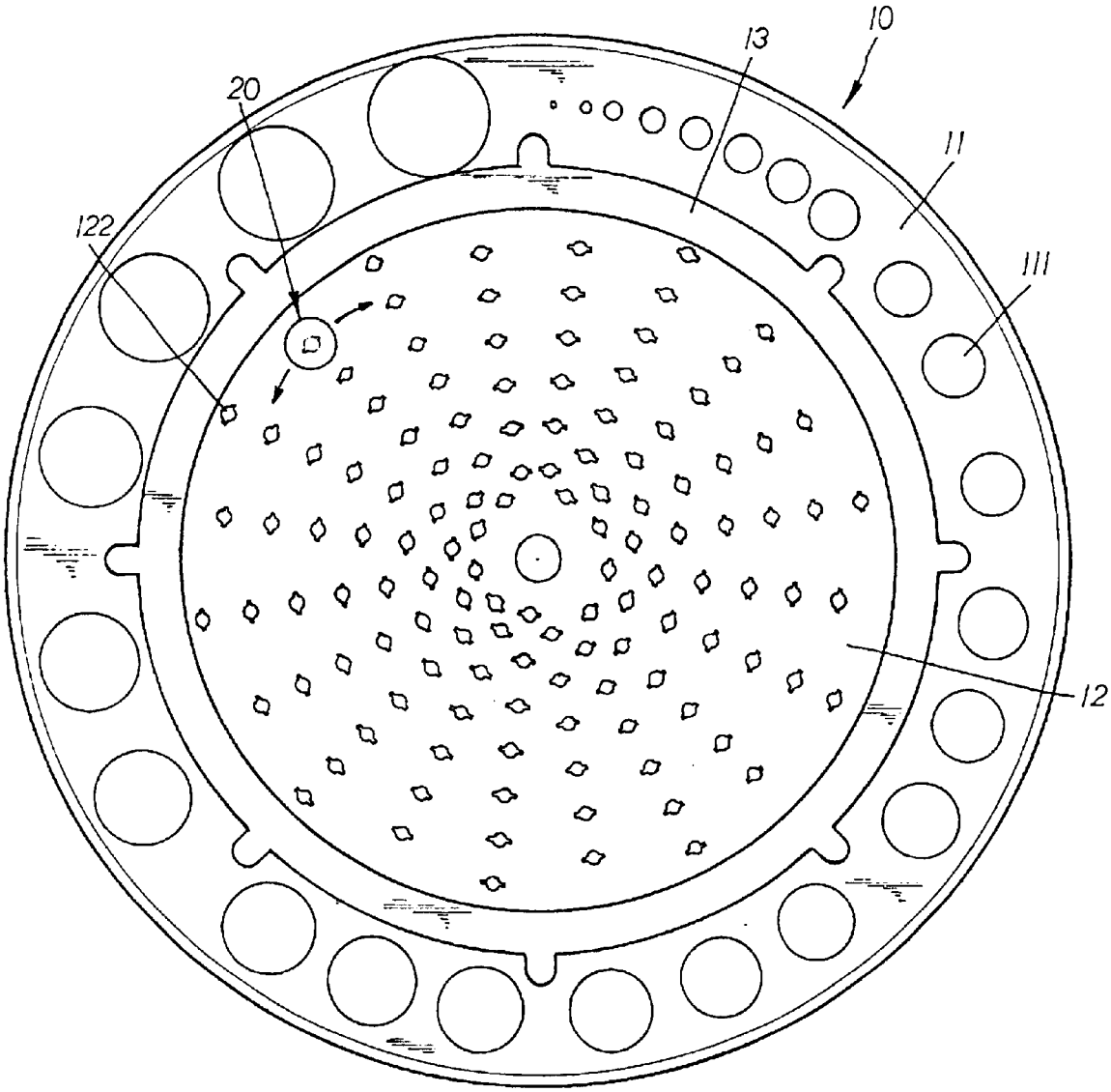
FIG. 5 is an elevation view of the circle cutter of the present invention in operation.
Figure 5A:
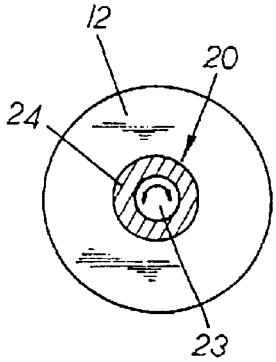
FIG. 5A is a top view of the cutting tool of the present invention.
Figure 5B:
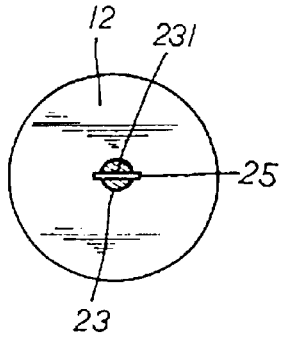
FIG. 5B is a bottom view of the cutting tool of the present invention.

As further shown in FIG. 5, the operation mode of the present invention is illustrated. The rotary disc assembly 10 is first placed in contact with a flat object to be cut, and a proper insertion hole 122 having a numeral 123 marked nearby on the rotary disc 12 is selected. Then the V-shaped cutting edge 251 of the cutting knife 25 as well as the smaller section of the knife clip 23 of the cutting tool 20 is engaged with the insertion hole 122. Thereby the pointed V-shaped cutting edge 251 can pierce into the object to be cut and with the knife clip 23 freely movable in the holding head 24, the pen stick 21 of the cutting tool 20 is held and driven to make the rotary disc 12 move in circle. It results in the cutting of a round circle on the object by the V-shaped cutting edge 251 of the cutting knife 25.

Figure 6:
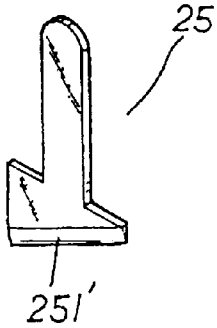
FIG. 6 is a perspective diagram showing the second embodiment of the knife of the cutting tool of the present invention.
Figure 7:
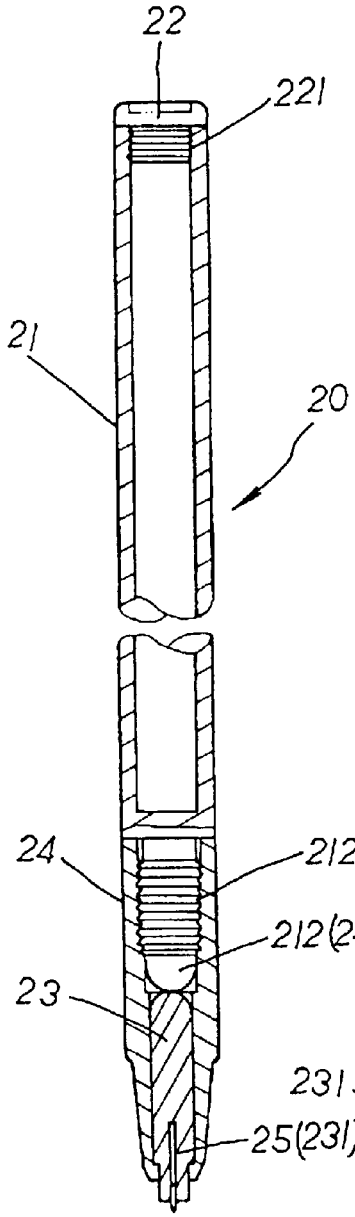
FIG. 7 is a diagram showing the sectional view of the cutting tool of the present invention.
Figure 7A:
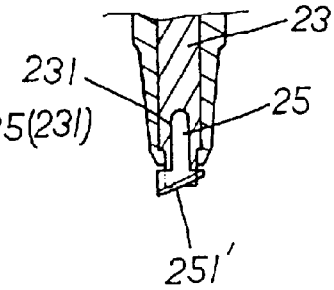
FIG. 7A is a diagram showing a partial side elevation view of the second embodiment knife of the cutting tool.

Referring to FIG. 6, the second embodiment of the cutting knife 25 having a right triangular shaped cutting edge 251' which can be more smoothly moved along a circular trajectory of cutting in synchronism with the knife clip 23 when the hollow pen stick 21 of the cutting tool 20 is forced to move circularly.

It can be clearly seen that the present invention has the following advantages in practical use. The operation of the circle cutter of the present invention becomes easier, and faster and the peripheral rim of a cut circular object is smooth and in good shape without causing any damage to a material used.

I claim:

1. A circle cutter, comprising:

a rotary disc assembly and a cutting tool;

said rotary disc assembly being made up of an outer ring board, a rotary disc, a fixing ring cap and a plurality of beads;

on a peripheral area of said outer ring board being disposed a plurality of consecutive circular holes of various diameters gradually reduced one by one for drawing circles;

on an inner flange of said outer ring board being disposed a bead retaining groove having a semi-circular cross section;

a raised peripheral rim being located next to said groove and a plurality of spaced retaining lugs extending radially from said rim;

each said lug being provided with an insertion hole;

at a periphery of said rotary disc being disposed a downwardly turned engagement flange having a groove having a semi-circular cross section in conformance to said bead retaining groove of said outer ring board;

a roof of said engagement flange having a smooth contour of a semi-circular cross section;

a plurality of insertion holes being spirally located on said rotary disc with their distances to a center of said rotary disc increasingly varied;

on said outer periphery of said fixing ring cap being disposed a plurality of spaced radially-extended locking lugs each having an engagement pin;

said cutting tool having a hollow pen stick, a top cap, a knife clip, a holding head and a cutting knife;

in a hollow interior of said pen stick spare cutting knifes being housed;

at a top end of said pen stick being disposed internal threads and at an opposite end thereof being disposed a round ended push head provided with external threads at an enlarged section thereof;

said top cap of a T-shaped cross section having external threads at a bottom end thereof;

said knife clip being of a two-staged cylinder having a dome-shaped top and a reverse T-shaped retaining recess for holding of said cutting knife;

said holding head having a cylindrical top section and a conic lower section having a 3-staged hole of various lengths;

said hole being provided with internal threads at the largest hole section thereof;

said cutting knife being made in an arrow shape and having a V-shaped cutting edge;

whereby said rotary disc is assembled with said beads being first placed in said bead retaining groove of said inner flange of said outer ring board and said rotary disc is then registered with a central void of said outer ring board; at the same time, the engagement flange of said rotary disc being registered with said inner flange of said outer ring board, then said fixing ring cap is engaged with said peripheral rim of said outer ring board with said locking lugs of said fixing ring cap registered with said lugs of said peripheral rim; accordingly, said rotary disc can be made to move when said cutting tool is selectively placed in one of said insertion holes with said cutting knife moving in circle to cut a circular object off a material.

2. The circle cutter as claimed in claim 1 wherein said lugs on said raised peripheral rim of said outer ring board and the locking lugs on said fixing ring cap are smoothly rounded of the contours thereof.

3. The circle cutter as claimed in claim 1 wherein said rotary disc has a diameter slightly smaller than an inner diameter of said raised peripheral rim of said outer ring board.

4. The circle cutter as claimed in claim 1 wherein a diameter of a circle to be drawn is marked beside each said insertion hole.

5. The circle cutter as claimed in claim 1 wherein said bottom surface of said rotary disc is positioned a little higher than that said outer ring board when engaged so that said rotary disc is not in contact with a surface of a table or a working plane.

6. The circle cutter as claimed in claim 1 wherein said hollow pen stick is provided with at a top end thereof internal threads and at an opposite end thereof is disposed a round ended push head provided with external threads at an enlarged section thereof.

*7. A rotary disc assembly for use with a cutting tool to cut circles from a material, said rotary disk assembly comprising:*

*an outer ring board having a grooved inner flange wherein a plurality of beads are disposed within said grooved inner flange of said outer ring board, said grooved inner flange having a semi-circular cross section; and*

*a rotary disc rotatably attached to said grooved inner flange of said outer ring board, said rotary disk having a plurality of insertions holes disposed thereon to engage said cutting tool, so that when said rotary disk assembly is placed on said material and said cutting tool is engaged with one of said plurality of insertion holes, and said rotary disk is rotated relative to said outer ring board, said material is cut to form a circle.*

*8. The rotary disc of claim 7, wherein said plurality of insertion holes are spirally located on said rotary disc with their distances to a center of said rotary disc increasingly varied.*

*9. The rotary disc of claim 7 wherein on a peripheral area of said outer ring board, a plurality of consecutive circular holes of various diameters gradually reduced one by one for drawing circles are disposed.*

*10. The rotary disc of claim 7 wherein said rotary disc further comprises an engagement flange, which corresponds to the grooved inner flange of said outer ring board, said engagement flange having a diameter slightly large than an inner diameter of said outer ring board.*

*11. The rotary disc of claim 7 wherein a diameter of a circle to be drawn is marked beside each said insertion hole.*

*12. The rotary disc of claim 7 wherein the bottom surface of said rotary disc is positioned a little higher than that of said outer ring board when engaged so that said rotary disc is not in contact with a surface of a table or a working plane.*

*13. A rotary disc assembly for use with a cutting tool to cut circles from a material, said rotary disk assembly comprising:*

*an outer ring board having a grooved inner flange and plurality of consecutive circular holes, disposed on the peripheral area of said outer ring board, wherein said circular holes are of various diameter gradually reduced one by one for drawing circles; and*

*a rotary disc rotatably attached to said grooved inner flange of said outer ring board, said rotary disk having a plurality of insertion holes disposed thereon to engage a cutting tool, so that when said rotary disk assembly is placed on said material and said cutting tool is engaged with one of said plurality of insertion holes, and said rotary disk is rotated relative to said outer ring board, said material is cut to form a circle.*

*14. The rotary disc of claim 13, wherein said plurality of insertion holes are spirally located on said rotary disc with their distances to a center of said rotary disc increasingly varied.*

*15. The rotary disc of claim 13 further comprising a plurality of beads disposed within said grooved inner flange of said outer ring board, said grooved inner flange having a semi-circular cross section.*

*16. The rotary disc of claim 13 wherein said rotary disc further comprises an engagement flange, which corresponds to the grooved inner flange of said outer ring board, said engagement flange having a diameter slightly large than an inner diameter of said outer ring board.*

*17. The rotary disc of claim 13 wherein a diameter of a circle to be drawn is marked beside each said insertion hole.*

*18. The rotary disc of claim 13 wherein the bottom surface of said rotary disc is positioned a little higher than that of said outer ring board when engaged so that said rotary disc is not in contact with a surface of a table or a working plane.*

* * * * *